United States Patent [19]

Eastman

[11] 3,889,203

[45] June 10, 1975

[54] MULTI-AXIS CAVITIES FOR GUNN EFFECT AMPLIFIERS

[75] Inventor: Lester F. Eastman, Ithaca, N.Y.

[73] Assignee: Cornell Research Foundation, Inc., Ithaca, N.Y.

[22] Filed: Aug. 15, 1974

[21] Appl. No.: 497,579

Related U.S. Application Data

[62] Division of Ser. No. 249,274, May 1, 1972.

[52] U.S. Cl. .......... 330/56; 330/34

[51] Int. Cl. .......... H03f 3/60; H03f 3/10

[58] Field of Search .......... 330/56, 34; 331/107 R, 331/107 G, 96

[56] References Cited

OTHER PUBLICATIONS

"Some Properties of Gunn-Effect Oscillation in a Biconical Cavity" G. S. Hobson, IEEE Trans. on Electron Devices Vol. Ed-14, No. 9, Sept. 1967.

RADC-TR-71-56 Tech. Report.

RADC-TR-71-116 Tech. Report.

"Electronics Letters," May 15, 1969, Ivanek et al. Vol. 5, No. 10, Pgs. 214-216.

*Primary Examiner*—John Kominski

[57] ABSTRACT

Multi-axis resonant cavities are provided in which a microwave semiconductor oscillator, e.g., an L.S.A. diode, operates in a below cut off mode with respect to the propagation characteristics of the cavity. An output coaxial transmission line extending into the cavity is radially spaced from the semiconductor and couples energy to a load by means of mutual inductance. In one arrangement, a flat circular cavity is formed in a block of electrically conductive material with a microwave semiconductor coaxially mounted at the center of the cavity having one face in electrical contact with a wave trap through which DC bias voltage is applied. The transmission line is off-center, adjacent to the semiconductor. In a modification of this arrangement, the floor of the circular cavity forms a truncated cone and the side wall comprises a spherical section. The angle of the conical floor is used to determine the cavity inductance. A flat elliptical cavity is described in one arrangement wherein the semiconductor and the transmission line are located respectively at the two foci of the ellipse. The elliptical cavity forms a resonator as well as means of coupling out energy. Other arrangements of the circular cavity are described in which a plurality of semiconductors are located symmetrically in the cavity. In another system a semiconductor is located at the center of the partial circular cavity connected to a ridge wave guide having a coaxial transmission line displaced from the semiconductor extending through the ridge. A special low impedance slug in the output line of a multi-axis cavity is designed to load the fundamental frequency of oscillation of the diode and reduce the loading at the second harmonic, thereby producing more power at the fundamental frequency. Varactortuned Gunn oscillator and Gunn effect amplifier embodiments are also presented.

3 Claims, 25 Drawing Figures

MULTI-AXIS CAVITIES FOR GUNN EFFECT AMPLIFIERS

This is a division of application Ser. No. 249,274, filed May 1, 1972.

BACKGROUND OF THE INVENTION

The present invention relates generally to the fields of microwave semiconductor oscillators and resonant cavities. More particularly, it is concerned with improvements in the structural and electrical design of resonant cavities for semiconductor oscillators.

Electrical oscillations in the microwave region can be induced in certain types of semiconductors known as transferred electron devices, such as Gunn effect and L.S.A. (limited spacecharge accumulation) diodes, under specific biasing conditions in certain forms of microwave cavities. In particular, the L.S.A. mode diode oscillator is currently under serious investigation as a new, relatively inexpensive miniature source of high power microwave signals, especially useful in the fields of communications and radar. Following Gunn's discovery of transit-time current oscillations in thin multilayer wafers of N-type gallium arsenide crystals, it was found, as explained for example by Copeland (Copeland, Proc. IEEE (letters), Volume 54, page 1479, 1966), that truly bulk (L.S.A.) oscillations could be induced in gallium arsenide crystals under certain conditions. The L.S.A. mode of operation of microwave diodes is characterized by the fact that an intermittent electrical field is applied between opposite faces of the specially designed diode. The field is established by direct current bias voltage pulses having a predetermined duty cycle and amplitude in excess of the Gunn threshold; and the microwave radio frequency output of the L.S.A. diode is in pulse form, rather than continuous wave as in Gunn effect devices operated in their normal manner. L.S.A. diodes require a specific amount of doping during manufacture to provide a controlled charge density in relation to the characteristic operating frequency. Unlike Gunn devices, the L.S.A. oscillators must be mounted in a resonator cavity which must provide a sharp reflection close to the diode in order to produce an effect termed localized resonance. The effect of the resonator coupled with the bias voltage pulses is to quench the growth of spaced charge at a predetermined point in time during each cycle of oscillation so that truly bulk oscillations are induced rather than the traveling domains characterizing the Gunn effect. The design of resonant cavities for L.S.A. diodes is made more difficult by the need to couple the microwave energy out to a useful load while maintaining the resonator characteristics of the cavity necessary for initiating and sustaining L.S.A. operation.

U.S. Pat. No. 3,562,666 to Daniel Rode shows several forms of self-resonant microwave oscillator cavities for L.S.A. diodes. FIGS. 6 and 7 of this patent illustrate an elliptical cavity with an L.S.A. diode at one focus and an output coupling transmission line at the other focus. The two-axis elliptical configuration is used for coupling output energy to the transmission line. However, the cavity is not used as a resonator to sustain L.S.A. operation. The resonance effect is supposedly provided by the crystal diode itself. Moreover, as will be more fully explained below, the characteristic frequency of the L.S.A. output is well above the cutoff frequency of the cavity for wave propagation. As a result the output coupling to the coaxial output may be represented as a direct transmission line. The type of operation contemplated by the patentee in the above system has been found to be inadequate to sustain L.S.A. oscillations at a satisfactory level.

Elliptical cavities of different design have been used even earlier (cf., Konrad and Cho, "Elliptic Cavity Couplers for Traveling Wave Tubes," IEEE Trans. on Electronic Devices Vol. ED–10, No. 2, pages 85–89, March 1963) to couple to a helix of a traveling wave tube and to an electron beam imbedded in a plasma column. It was known at that time that a cutoff frequency of the main T.E.M. mode existed at the condition that the distance along the major axis between a focus line and the cavity wall was one quarter wavelength. Above this frequency a broad band impedence match could be established between the output coaxial line and the cavity. The equivalent circuit was that of a transmission line with an associated time delay, from one focus line to the other focus line, due the uniform single bounce distance from one focus line to the wall and back to the other focus line. It is this above cutoff operation which the patent to Rode apparently utilized in coupling energy from the self-resonant L.S.A. diode to the transmission line.

The invention is also concerned with the problem of scaling a resonant cavity in order to provide different resonant frequencies. For example, it has been found that in a radial cavity, as described below, lower frequency operation of an L.S.A. diode requires increasing the radius in order to raise the inductance. At relatively low frequencies the cavity would become cumbersome as the radius would have to be made very large.

The power in the output of an L.S.A. diode is normally distributed over a number of frequencies including the fundamental frequency and harmonics thereof. It is known that most of the energy is concentrated in the fundamental and second harmonic frequencies. One of the problems to which this invention is directed is a means for increasing the power in the output at the fundamental frequency.

SUMMARY OF THE INVENTION

Accordingly, the general purpose of the invention is to sustain semiconductor microwave oscillations and couple oscillatory energy to an external load by means of a resonant cavity satisfying certain requirements for a given semiconductor microwave oscillator. One of the more specific objects of the invention is to provide a resonator cavity for L.S.A. diodes in which the energy is coupled out by means of a coaxial transmission line. A further object of the invention is to provide cavities for low frequency operation which are smaller in size. Still another object of the invention is to optimize output coupling at the fundamental frequency of oscillation in a semiconductor microwave oscillator circuit. Other objects of the invention will be evident in the disclosure which follows.

The applicant has discovered a number of related cavity designs for microwave oscillators having in common the use of multi-axis geometry for the relative positioning of one or more diodes and an output coaxial transmission line. In all of the cavity geometries described below, the inductance of the cavity itself can be used in cooperation with the capacitance of the diode oscillator to provide a resonant circuit appropriate for sustaining oscillations, and in the case of L.S.A. diodes, for causing the requisite quenching of the space-charge buildup. The cavities also have in common an output coupling mechanism which can be described as mutual inductance, as opposed to circuits in which output coupling from the oscillator to the coaxial ouput is equivalent to a transmission line.

The propagation characteristics of the elliptical cavity referred to above, as well as other cavities which will be described, is characterized by a cutoff frequency similar to that associated with conventional wave-guides. This frequency is determined in the case of an elliptical cavity by the distance from one focus along the major elliptical axis to the cavity wall. Cutoff occurs when this distance is one-quarter of the wave length of oscillation. In other words, the cutoff frequency is four times this distance.

Above cutoff operation of an elliptical cavity for certain microwave devices has been previously described. It has now been discovered that a microwave diode oscillating at a frequency below this cutoff produces in effect a different equivalent circuit, which, for output coupling, acts not as a transmission line but as a mutual inductance. Below cutoff, two quasi-static inductance elements associated with each focus line electrode and the cavity wall nearby are formed, and there is a mutual coupling inductance between these elements.

This system may be used to advantage with an L.S.A. diode, for example, positioned at one focus of the elliptical cavity. A wave trap preventing RF leakage is formed in the cavity wall of the diode providing a direct current connection to the diode face for applying bias voltage. By selecting an L.S.A. diode having a characteristic frequency below the cutoff frequency of the cavity and by applying suitable bias voltage, the L.S.A. oscillator produces an output which is below the propagation cutoff frequency of the cavity. The inductance of the cavity below cutoff is used to resonate the capacitance of the diode in a parallel resonant circuit. The output coupling or loading is accomplished through the mutual inductance present in the below-cutoff situation.

The concept of the multi-axis cavity for a microwave semi-conductor operated at a below-cutoff frequency level causing output coupling through mutual inductance has been extended to other cavity geometries with even greater success. In one system, a circular or radial cavity is formed in a block of electrically conductive material. The output coaxial transmission line and the semiconductor oscillator are spaced closely together near the center of the cavity. Again, DC bias voltage is applied through a wave trap. The cutoff frequency associated with this radial cavity design is determined in a manner similar to that of the elliptical cavity. In this case, the distance which determines the cutoff frequency is the distance from the semiconductor to the nearest point along the side wall of the cavity. The semi-conductor oscillator is designed to oscillate at a frequency below this cutoff so that the equivalent circuit is a mutual inductance arrangement. The mutual inductance is raised by bringing the electrode axes closer together.

The frequency of operation of an L.S.A. diode oscillator in a radial cavity of the type described above is associated with the inductance provided by the cavity itself, as determined by the distance of the diode from the nearby cavity sidewall. In order to lower the frequency of operation, the inductance provided by the cavity must be increased. To increase the inductance of a flat radial cavity, as described herein, the radius must be increased. A cavity geometry which obviates this increase in radius has been discovered. In one embodiment, the flat circular floor of the cavity is replaced by a truncated conical surface coaxial with the planar circular upper wall of the cavity. The sidewall of the cavity joining the upper and lower walls constitutes a spherical section. The semiconductor oscillator is mounted centrally on the flat portion of the truncated conical floor surface. A bias voltage wave trap is formed in the upper planar wall of the cavity and contacts the diode. The transmission line, as it is called, from the diode to the sidewall has a linearly increasing height. The constant characteristic impedence of the radial transmission line can be shown to be proportional to the angle which the conical floor makes with the flat upper surface of the cavity. As a result, the inductance of the conical cavity can be changed by varying the angle of the cone rather than by changing the radius of the entire cavity.

In a radial cavity having planar upper and lower walls, the height of the radial transmission line is constant and the characteristic impedence varies with radial distance. Thus, a radially propagating wave encounters minor reflections before the wave has traveled to the outer sidewall. In the conical cavity, a wave propagating radially away from the cavity's center encounters no reflection until it meets the sidewall of the cavity. With the single sharp reflection provided by the conical cavity, the wave which is bounced back to the diode has the same harmonic and phase content as the initial wave leaving the diode. This factor is extremely important in L.S.A. operation as the voltage induced in the diode by microwave oscillations bounced back to the diode is used ideally in combination with the bias voltage to cause the diode to be sent sharply back below the threshold voltage for oscillation in order to suppress space-charge growth.

In another multi-axis cavity geometry a flat circular or radial cavity is formed with the output coaxial line located at the center of the cavity. One or more semiconductor oscillators are positioned symmetrically about the output line. Each diode requires its own wave trap for applying bias voltage. The individual diodes resonate with the inductance associated with the distance between the diode and the nearby wall of the cavity in a below-cutoff situation as before. The outputs of multiple diodes coupled by mutual inductance to the output line combine to produce an output of higher power. Another use for multi-diode cavities involves alternating the operation of the diodes in order to produce a succession of more closely spaced microwave output pulses than can be obtained with a single diode. The duty cycle and repetition frequency of a given L.S.A. oscillator is restricted because of the well known heating effect of continuous operation.

In another cavity arrangement a ridge wave guide is used to connect a small diameter cavity having a centrally mounted semiconductor oscillator to an output coaxial transmission line located in the ridge of the wave guide a short distance away. The ridge wave guide provides a transmission line with strong coupling from the diode to the coaxial output line. Again, however, the diode is resonated with the inductance associated with the nearby wall of the circular cavity. The ridge-connected configuration can be extended to allow simultaneous or alternating operation of two or more pulsed semiconductor devices coupled into a single output transmission line. For example, in one embodiment a partially open radial cavity is located at either end of the ridge wave guide with the coaxial transmission line located at the midpoint of the ridge between the two diode cavities.

A convenient means of controlling the loading of both second harmonic and fundamental frequency components of the outputs of semiconductor oscillators in resonant cavities has also been discovered. In the flat cavity described above, the coaxial output transmission line is equipped with a low impedance section called a slug providing a controlled discontinuity along the axis of the output transmission line. As will be explained in detail below, a slug which has a length equal to one-quarter of the wave length under measurement can be positioned along the output transmission line in order to affect the loading of this particular frequency component. Two separate effects can be achieved by this technique, both of which affect the amount of power contained in the fundamental frequency output of the diode. First, if the low impedance slug is positioned so as to increase the loading at the fundamental frequency, more power will be produced in the fundamental frequency than would be without the slug. Second, if a slug is designed and positioned so that the second harmonic of the fundamental frequency alone is unloaded, more power is transferred to the fundamental frequency. A single slug can accomplish both loading of the fundamental frequency and unloading of the second harmonic at the same time if the slug has a length equal to one-eighth of the fundamental frequency, offers low impedance to both fundamental and second harmonic frequencies, and is positioned in a predetermined manner, as will be explained below.

DESCRIPTION OF THE PREFERRED EMBODIMENTS

Figure 1:
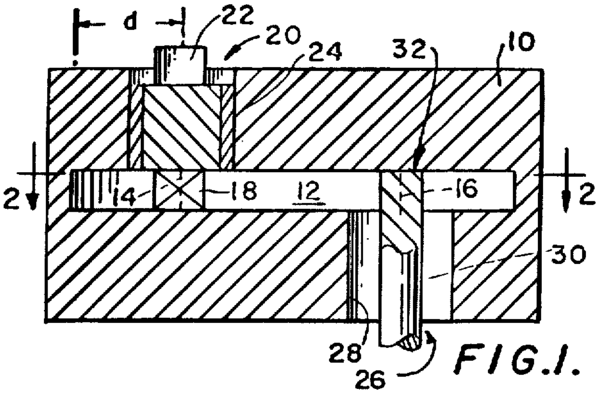
FIG. 1 is a sectional view of a multi-axis elliptical cavity taken in a plane parallel to the focus lines.
Figure 2:
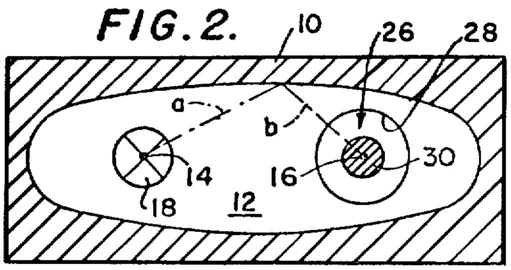
FIG. 2 is a sectional view taken along lines 2—2 of FIG. 1 illustrating the elliptical cross section of the cavity and the location of the electrodes at the two foci.

The elliptical cross section cavity shown in FIGS. 1 and 2 comprises a rectangular block 10 of electrically conductive material in which an elliptical cavity 12 is formed defined by parallel, planar upper and lower elliptical surfaces joined by a continuous elliptical, ring-shaped sidewall. The upper and lower elliptical surfaces each have a pair of geometrical focus points. The lines joining corresponding foci in the upper and lower surfaces constitute focal lines 14 and 16. A semiconductor oscillator, such as a L.S.A. diode, is mounted coaxially with the focal line 14. In the illustrated case the height of the elliptical cavity is equal to the height of the diode. If the diode is not as high as the cavity, as electrically conductive post (not shown) may be inserted coaxially with the line 14 on which the diode 18 may be mounted. One face of the diode 18 is in electrical contact with the conductive floor of the cavity 12. A bulky wave trap assembly 20 is mounted directly above the diode 18 in a suitable opening in the block 10. The wave trap 20 as shown comprises a conductive rod 22 in electrical contact with the opposite face of the diode 18 and an annular dielectric 24 forming a wave blocking impedance (an RF short) to prevent leakage of RF energy out of the cavity 12. DC bias voltage is applied to the diode 18 between the conductor 22 and the conductive block 10, electrically connected respectively to opposite faces of the diode 18. The wave trap illustrated (coaxial transmission line slug type) is schematic only. Several other types can be used such as the well known thin dielectric disc (radial transmission line slug type) of mica or similar material. At the other focus line 16, a coaxial transmission line 26 is located. The transmission line 26 includes a circular opening 28 in the block 10 formed through the floor of the cavity 12 and a center conductor 30 mounted coaxially with the focus line 16 and the opening 28. The conductor 30 has one end in electrical contact with the uppe surface of the cavity 12 and extends out of the cavity through the opening 28. The transmission line 26 couples RF energy from the cavity to an external load (not shown).

The detailed description of the wave trap as well as the coaxial transmission line will be dispensed within discussing the other cavities described herein and these individual elements will be understood to be similar in design and function to those described in connection with FIGS. 1 and 2, unless otherwise stated.

Figure 3:
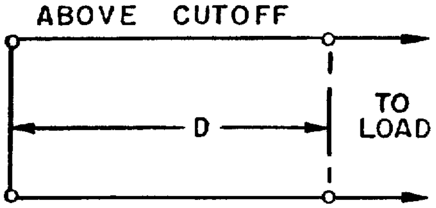
FIG. 3 is a schematic drawing illustrating the equivalent circuit for output coupling in the cavity of FIGS. 1 and 2 when the microwave device is operated above cutoff.
Figure 4:
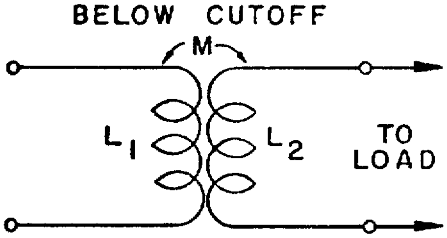
FIG. 4 is a schematic drawing illustrating the equivalent circuit for the cavity of FIGS. 1 and 2 when the microwave device is operated at below cutoff.

The elliptical cavity of FIGS. 1 and 2 has a propagation cutoff frequency, much like that in a conventional wave guide, when the distance D from an axis, such as focal line 14 in FIG. 2 to the nearby sidewall along the major axis of the ellipse is about a quarter of a wavelength at the operating frequency of the diode 18. Above this cutoff frequency a well behaved low loss transmission occurs. Thus, the mechanism by which a wave propagating from the diode 18 reaches the transmission line 26 may be considered to be a simple transmission line as shown schematically in FIG. 3. The distance D represents a delay corresponding to the uniform single bounce distance $a+b=D$ in the cavity 12 from one axis to the other via the sidewall. When the semiconductor is operated at a frequency such that the wavelength is at least four times the distance d in FIG. 1, the operation is termed below cutoff. In the below cutoff situation the transmission line mechanism disappears and is replaced by a mutual inductance effect. When the operation of the diode is near or below a frequency equal to half of the cutoff frequency the equivalent circuit for output coupling is a lumped inductance circuit as shown schematically in FIG. 4. One inductance $L_1$ is associated with the focal line 14 at the position of the diode 18 and other inductance $L_2$ is associated with the position of the transmission line 26 at the other focal line 18. Below cutoff oscillations in the elliptical cavity yield magnetic fields that are in phase throughout the structure, a condition referred to as localized resonance. For this reason the inductance elements associated with each focus line electrode may be considered to be quasi-static. A mutual coupling inductance M is present between these elements, and this is the mechanism by which output coupling of RF energy is accomplished at the below cutoff situation.

In the elliptical cavities of FIGS. 1 and 2 the inductance of the cavity below cutoff is used to resonate the capacitance of the semiconductor oscillator in a parallel resonant circuit. The loading is accomplished through the mutual inductance which acts as a high frequency transformer. If the value of the mutual inductance is low, a quarter wave section (not shown) of low characteristic impedance may be located adjacent to the cavity in the output coaxial transmission line 26 in order to increase the power coupled through the mutual inductance. It is also possible to improve the coupling with a small capacitance in series with the output transmission line. The capacitance would be physically located between the end of the center conductor 30 of the transmission line 26 and the upper wall of the elliptical cavity at the position indicated by reference numberal 32 in FIG. 1.

Figures 5, 6, 7, 8, 8A:
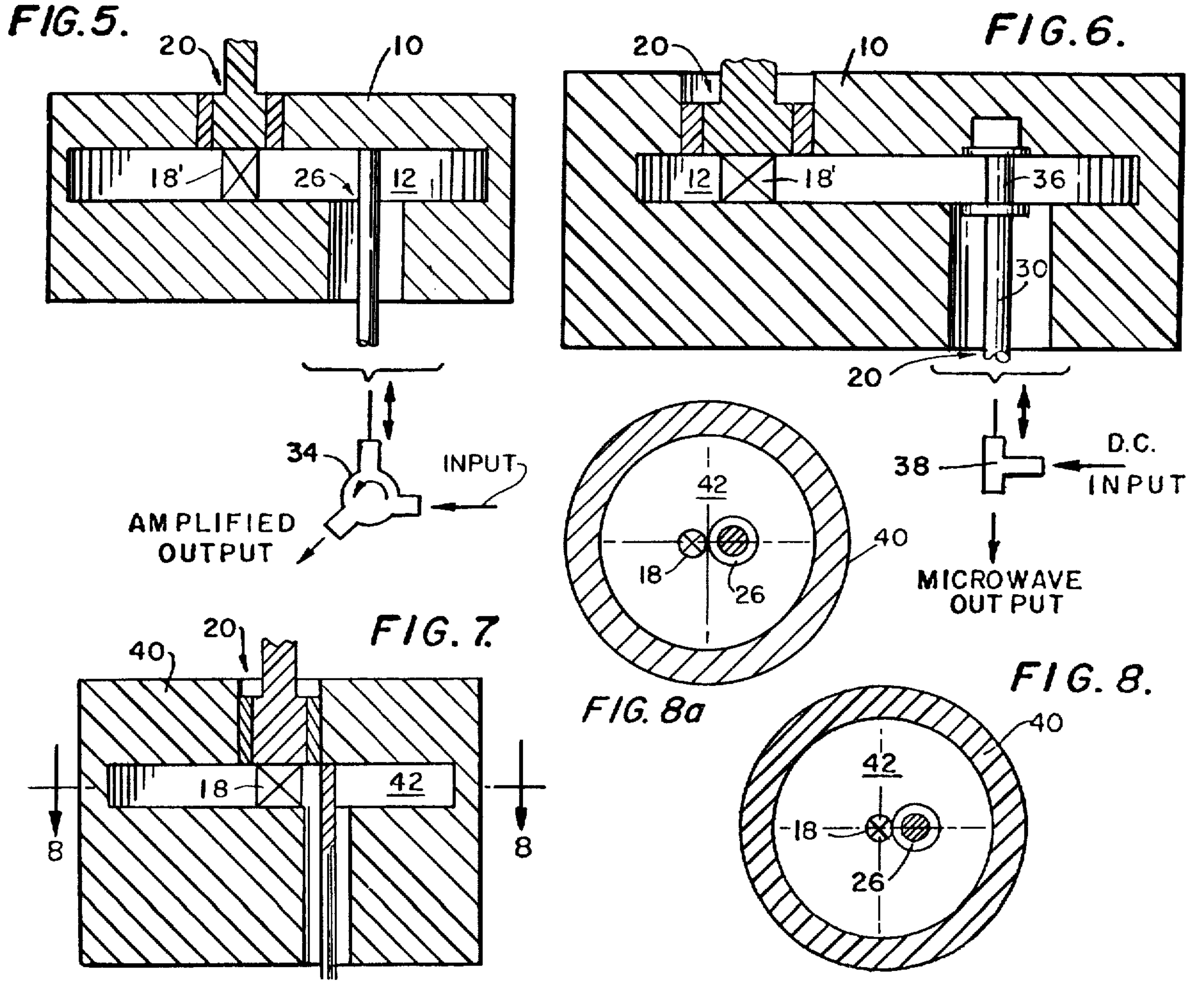
FIG. 5 is a sectional view of an elliptical microwave cavity taken in a plane parallel to the focus lines wherein the microwave device is a Gunn diode operated as a Gunn amplifier.
FIG. 6 is a sectional view similar to that of FIG. 5 of an elliptical cavity in which the semiconductor is a Gunn diode and a varactor diode is located in the output line to form a varactor-tuned Gunn oscillator.
FIg. 7 is a sectional view of a multi-axis radial cavity having a flat circular shape, taken in a plane containing the cavity axis.
FIG. 8 is a cross-sectional view taken along line 8—8 of FIG. 7.

In FIg. 5 a continuous wave Gunn amplifier application of the elliptical cavity 12 enables operation over an extremely broad frequency range. In this case the semiconductor 18' located at one focus line is a Gunn diode. A three port microwave circulator 34 external to the cavity structure is coupled to the output transmission line 26. The circulator 34 provides one input port for microwave input signals and an output port for amplified microwave output signals. The circulator causes the microwave input signals to be introduced into the cavity at the focal line associated with the output transmission line 26. For Gunn amplification the frequency of operation is above the cutoff of the cavity so that propagation from one focus line to the other focus line is by means of the transmission line equivalent circuit. The microwave voltage induced in the Gunn diode 18' adds with the steady DC bias voltage applied through the wave trap 20 and causes the Gunn diode to amplify the signal at the input frequency. The output of the Gunn diode is coupled by the transmission line effect to the coaxial output transmission line 26 from which it is coupled out by the circulator 34. The range of operation of the Gunn diode selected for use with this circuit should have its lower frequency end near the cutoff frequency of the cavity. Extreme care must be taken in matching the impedance at the intersection of the output coaxial line 26 and the cavity because no reflections or oscillations should occur over the full working bandwidth of the Gunn diode when operated as an amplifier.

In FIG. 6 the elliptical cavity 12 is employed in connection with a varactor-turned Gunn diode. In this embodiment a Gunn diode 18' is positioned at one of the focus lines of the cavity, and the coaxial transmission line 26 at the other focus line includes a varactor diode 36 positioned in the cavity 12 between the interior end of the center wire 30 of the transmission line and the upper cavity wall. The varactor 36 is a back-biased PN diode providing a capacitance which varies with the applied DC voltage. A bias tee junction 38 is included in the output transmission line. The bias tee 38 provides a means for applying DC voltage to the varactor as well as for extracting microwave energy from the cavity 12. The Gunn diode 18 may be operated below or above cutoff of the cavity. The varactor 36 provides a means for modulating the output of the Gunn diode 18'. One of the advantages of the elliptical cavity 12 as used for the varactor-tuned Gunn oscillator is an increased tuning range of 10% (or more) of the operating frequency.

The extremely useful mutual inductance characteristic present at the below cutoff frequency operation of the elliptical cavity 12 in FIGS. 1 and 2 is also present in other related geometries that are not precisely elliptical but have two or more axes or location of the diode and output line. One of the most important of these geometries is the circular radial cavity depicted in FIGS. 7 and 8. A block 40 of electrically conductive material is formed with a short cylindrical or disc-shaped cavity 42. The upper and lower walls of the cavity 42 are parallel, circular flat surfaces joined by a continuous sidewall. A semiconductor oscillator 18 is mounted at the center of the cavity 42 having one face in contact with the block 40 and the other face in contact with a wave trap 20 through which DC bias voltage is applied. The axis of the output transmission line is located as close as possible to the diode center line. The cutoff of the cavity 42 is determined by the radial distance from the diode 18 to the sidewall of the circular cavity 42.

When the semiconductor 18 is operated at a frequency below the cutoff of the cavity, output coupling is accomplished by means of the mutual inductance between the diode 18 and the output line 26. This mutual inductance may be raised by juxtaposing the axes of the output line and the diode 18 as close as possible.

The circular cavity 42 also lends itself to operation with a varactor-tune Gunn diode. In this case the semiconductor 18 is a Gunn diode and a varactor diode is located, as in FIG. 6, at the interior end of the transmission line 26 within the cavity 42.

Instead of centering the semiconductor 18 in the cavity 42, the transmission line 26 and diode 18 may be symmetrically spaced about the center line of the cavity 42. However, the position of the semiconductor 18 at the center of the circular cavity 42 with the transmission line 26 slightly off center is considered to be particularly advantageous for several reasons. Construction is simplified and in the case of pulsed L.S.A. devices, their operation is enhanced by providing a well defined time of reflection from the outer wall during the first cycle or two of oscillation because the distance from the diode to the wall is uniform in all directions.

Figure 9:
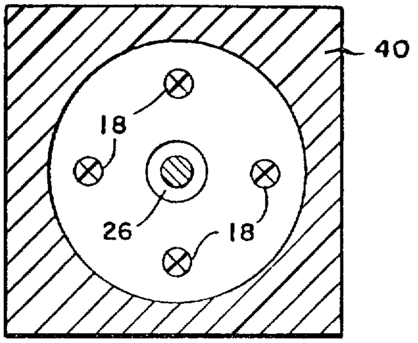
FIG. 9 is a sectional view similar to that of FIG. 8 showing a flat circular radial cavity having a plurality of diodes.

Another use of the circular cavity 42 is shown in FIG. 9 in which the coaxial transmission line 26 is located at the center of the cavity. Here, a plurality of symmetrically spaced diodes 18 are located about the center of the cavity. Each of the diodes 18 has its own bias voltage wave trap (not shown). The diodes 18 resonate with the inductance associated with the distance between the diodes and the nearby wall. The diodes must be selected and operated so as to obtain the below-cutoff situation described above. The outputs of the plural diodes 18 are coup;ed by mutual inductance to the transmission line 26.

Figure 10:
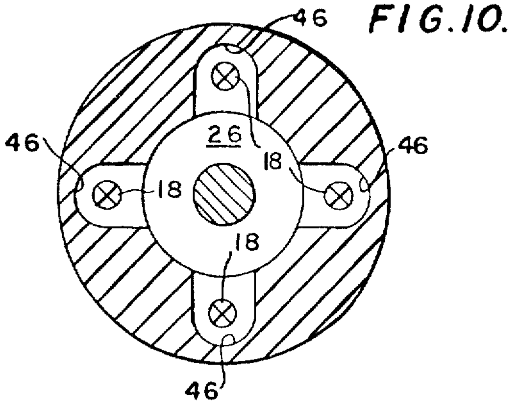
FIG. 10 is a sectional view similar to that of FIG. 9 illustrating another plural diode embodiment.

In FIG. 10 another embodiment employing radial cavities and plural diodes is shown wherein a block 44 of electrically conductive material has a plurality of partially circular cavities 46 arranged symmetrically about a central coaxial transmission line 26. Diodes 18 are located respectively in the small radial cavities 46. While the arrangement of FIG. 10 reduces the output coupling to the transmission line 26 from each of the diodes operating alone, the simultaneous, synchronous operation of the diodes offsets this decrease in coupling. As a result two diodes produce more than twice the power of one diode operating alone. The reduced size of the cavities 46 lowers the inductance near the diodes 18 and raises their frequency of operation.

Figure 11:
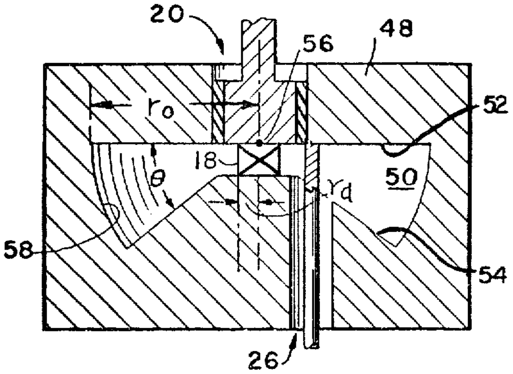
FIG. 11 is a sectional view similar to that of FIG. 7 of another form of multi-axis radial cavity in which the floor of the cavity comprises a section of a cone.

In FIG. 11 a particularly advantageous form of radial cavity is depicted. A cavity 50 of complex shape, referred to for convenience as a conical cavity, is formed in a conductive block 48. The upper surface 52 of the cavity 50 is a circular planar surfaçe. The lower surface or floor 54 of the cavity 50 is in the form of a truncated cone, whose geometric vertex, if extended would coincide with the center 56 of the upper circular surface 52. The axis of the conical surface should also be perpendicular to the planar surface 52. The diode 18 is mounted at the center of the cavity on the truncated flat portion of the conical surface 54. The distance from the truncated flat portion of the floor 54 to the bias wave trap 20 is approximately equal to the height of the diode 18. The upper and lower surfaces of the cavity 50 are joined by a circular continuous spherical sidewall 58. The sidewall 58 meets the upper surface 52 and the conical surface 54 at right angles. In other words, the center point of the spherical surface 58 is the center point 56 in the plane of the upper surface 52.

The centrally located diode 18 is again operated in the below cutoff mode as determined by the cavity radius, so that strong mutual inductance between the diode 18 and the off-center, adjacent transmission line 26 occurs. The conical surface 54 and the planar upper surface 52 form a conical, radial transmission line. The characteristic impedance of this transmission line is approximately 60 ($\theta$) ) ohms where $\theta$ is the cavity angle of the opening in radians. This characteristic impedance is constant with increasing radial distance from the center of the cavity. This feature is in contrast to the situation for a flat circular cavity, as shown in FIG. 7, where the impedance varies with the radius. In the case of the conical cavity, because of the constant characteristic impedance, a wave propagating radially from the center of the cavity encounters no reflection until it meets the outer sidewall 58. This is a particularly important advantage for L.S.A. operation. Because no reflection occurs at the diode 18 until the wave has traveled to the outer spherical wall 58 and back, the delayed reflection is especially sharp, falling rapidly in time due to the constant characteristic impedance. The wave which is bounced back to the diode 18 is identical with respect to all of the harmonic and phase components of the initial wave leaving the diode 18. Although the flat circular cavity is somewhat easier to construct, the non-constant characteristic impedance causes minor reflections before the wave encounters the sidewall of the circular cavity 42 in FIG. 7. On the other hand, in the conical cavity 50, the L.S.A. diode is sent sharply back below threshold voltage after the first half cycle of oscillation suppressing the space charge growth and thus providing the necessary action for limited space charge accumulation operation of bulk effect devices.

The inductance of the conical cavity 50 is proportional to $Z_o(r_o-r_d)$, where $Z_0$ is 60 ($\theta$) as mentioned above and $r_o$ and $r_d$ are the outer cavity radius and the diode radius respectively. With a fixed $r_o$ it is possible to raise this inductance to accomplish a lower microwave frequency of operation, while still keeping the gap between the truncated cone top and the top wall 52 at a fixed value equal to the diode height. With the flat circular cavity 42 of FIG. 7, the radius of the cavity itself must be increased in order to accomplish lower frequency operation. Accordingly, the conical cavity 50 of FIG. 11 has the advantage that the angle $\theta$ can be increased, that is, the cone can be sharpened to increase the inductance while the radius of the cavity remains the same. Thus for low frequency operation the conical cavity 50 is more compact than the radial flat circular cavity 42 of FIG. 7.

The conical cavity 50 illustrated in FIG. 11 may be modified in a number of ways while still retaining the feature of constant characteristic impedance and variable inductance with the same cavity radius. For example, the upper wall 52 may be made conical instead of the lower wall 54. Or, both walls 52 and 54 may be made to form opposing conical surfaces. In all of these cases the height of the cavity in the axial direction increases linearly with radial distance. In some cases, it may be possible to approximate a spherical section of the sidewall 58 by a simpler sidewall having a flat cross section. In this case the sidewall would then be a section of a cone rather than a sphere.

Figure 12:
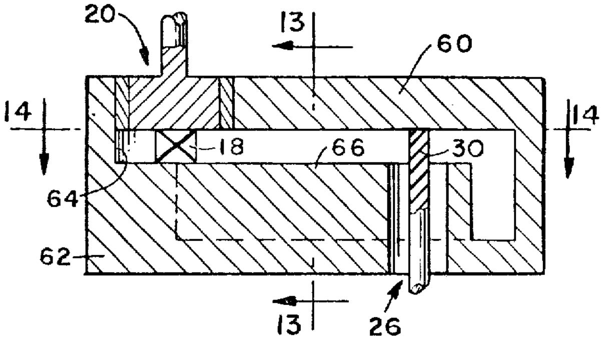
FIG. 12 is a longitudinal sectional view of another form of radial cavity connected to an output line by means of a ridge wave guide.
Figure 13:
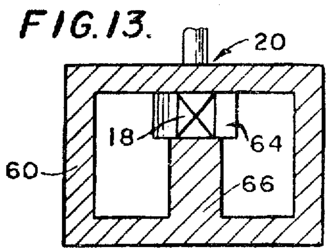
FIG. 13 is a sectional view of the ridge connected cavity taken alonge lines 13—13 of FIG. 12.
Figure 14:
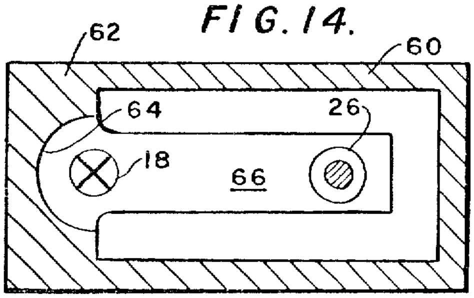
FIG. 14 is a sectional view of the ridge connected cavity taken along lines 14—14 of FIG. 12.

With the flat circular cavity 42 of FIG. 7 or the conical cavity 50 of FIG. 11, the separation of the diode axis and the output transmission line axis is a critical factor in determining the degree of output coupling. It has been found in using these cavities that the separation diameter in order to achieve strong output coupling. L.S.A. diodes of normal size are usually mounted in a cartridge or heat sink which is typically 0.125 inches in diameter. Likewise, the smallest convenient size for the coaxial transmission line is also 0.125 inches in diameter. Thus, the closest spacing of the center lines is 0.125 inches. At 6 GHz (gigahertz) operation of the cavity diameter should be about 0.40 inches. At 8 GHz the diameter must be reduced to about t0.30 inches, and even smaller for higher frequencies. Even at 6 GHz the cavity diameter is small enough compared to the minimal 0.125 inch separation of the center lines to lower the coupling of output power. FIGs. 12, 13, and 14 illustrate a system which generally avoids this problem by providing a controlled increase of separation between the diode and the coaxial transmission line with a well behaved wave guide transmission line between them allowing strong output coupling at higher frequencies.

In FIG. 12 a box shaped rectangular housing 60 of electrically conductive material includes an end portion 62 having a partial disc-shaped radial cavity 64 formed at the top of the inside wall. The cavity 64 is open to the remaining interior of the housing 60. A semiconductor oscillator 18 is located at the center of the radial cavity. A wave trap 20 for applying bias voltage is located directly above the diode 18 in the upper wall of the housing 60. The remainder of the housing 60, to the right of the diode 18 as viewed in FIG. 11, is not used as part of the resonator for sustaining oscillation but forms a ridge wave guide for coupling energy from the diode 18 to the transmission line 26. A rectangular slab or ridge 66 parallel to the longitudinal sidewalls of the housing 60 is mounted on the floor of the housing midway between the sidewalls. The height of the ridge 66 is less than the interior height within the housing 60. The ridge 66 extends from the middle of the end portion 62 through the interior of the housing 60 and terminates short of the end portion of the housing opposite from the end 62. A coaxial transmission line 26 passes through the ridge 66 parallel to the longitudinal sidewalls of the housing 60, with the center conductor 30 in contact with the upper wall of the housing 60. It is convenient to place the coaxial transmission line approximately a quarter wave length from the diode along the ridge wave guide at the operating frequency of the diode 18, so that the impedance of this quarter wave section can be designed as a transformer between the cavity 64 and the output line 26. Other short lengths can also be used, however. The frequency bandwidth of such a quarter wave section is sufficiently wide to provide convenient operation with no irregularities in tuning.

The ridge wave guide connected cavity is particularly advantageous because the ridge wave guide has a propagation cutoff frequency much lower than an ordinary wave guide of the same size without the ridge. Accordingly, the ridge wave guide utilized in this embodiment is much smaller than its ordinary wave guide counterpart. In addition, the structure of the ridge wave guide causes the electric field to be concentrated in the gap between the top of the ridge 66 and the upper interior surface of the housing 60. The ridge is terminated shortly after the position of the coaxial output transmission line 26 in order to reduce the number of reflections that might prevent proper oscillation buildup in the case of an L.S.A. diode.

Figure 15:
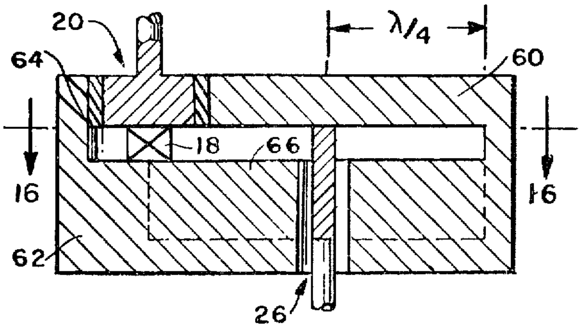
FIG. 15 is a longitudinal sectional view similar to that of FIG. 12 showing another embodiment of the ridge connected cavity.
Figure 16:
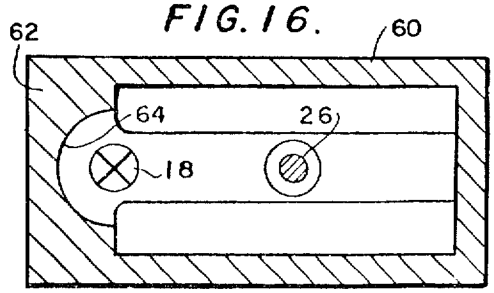
FIG. 16 is a sectional view taken along lines 16—16 of FIG. 15.
Figure 17:
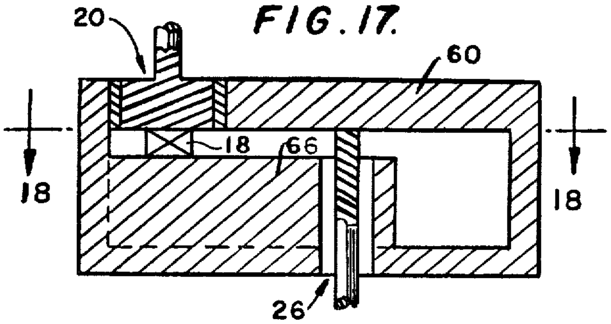
FIG. 17 is a longitudinal sectional view similar to that of FIG. 15 showing an alternate embodiment of the ridge connected cavity wherein the diode is mounted on the ridge itself.
Figure 18:
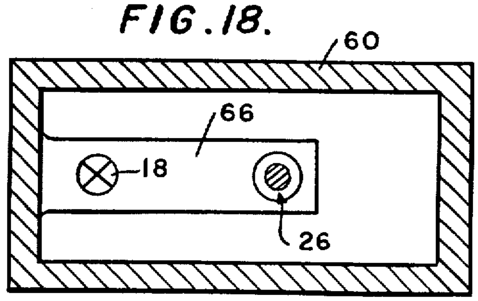
FIG. 18 is a sectional view of the ridge mounted diode arrangement taken along lines 18—18 of FIG. 17.

However, as shown in FIGS. 15 and 16 the ridge 66 may be continued to a more distant short circuit against the end wall of the housing 60 opposite from the end portion 62. In this configuration the coaxial output line would be located midway between the diode 18 and the opposite end wall. The distance from the coaxial output line to the opposite end wall should be approximately one-quarter wave length at the operating frequency of the diode.

It is also possible to dispense with the circular cavity 64 of FIG. 12 and mount the diode 18 directly on the ridge 66. The diode 18 should be located a small distance from the intersection of the ridge end and end wall so that appropriate reflection will occur. A shortcoming of this configuration is that less heat removal is possible through the ridge than through the block under the circular cvity 64 in the case of the embodiments in FIGS. 12 through 16. At higher frequencies where a narrower ridge is required, if the width of the ridge becomes too small to accommodate an aperture for the coaxial transmission line, the line may be taken out through the upper wall of the housing with the center wire in electrical contact with the top of the ridge 66 (not shown).

Figure 19:
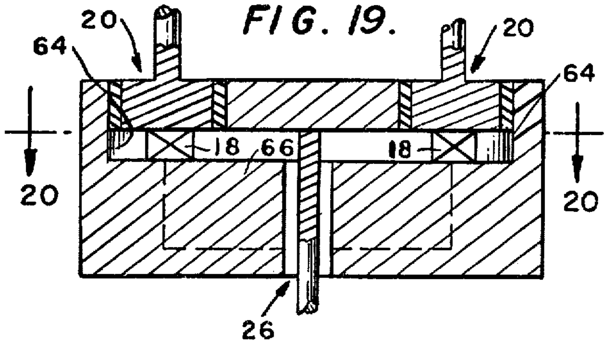
FIG. 19 is a longitudinal sectional view of another embodiment of the ridge-connected cavity in which a pair of diodes are mounted in respective radial cavities at opposite ends of the ridge wave guide.
Figure 20:
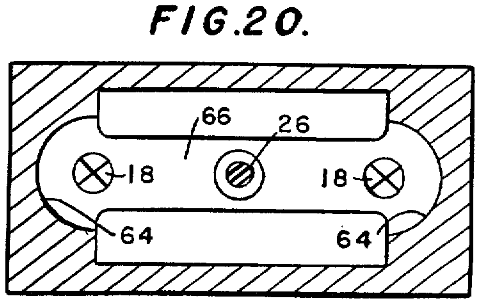
FIG. 20 is a sectional view taken along lines 20—20 of FIG. 19.
Figure 21:
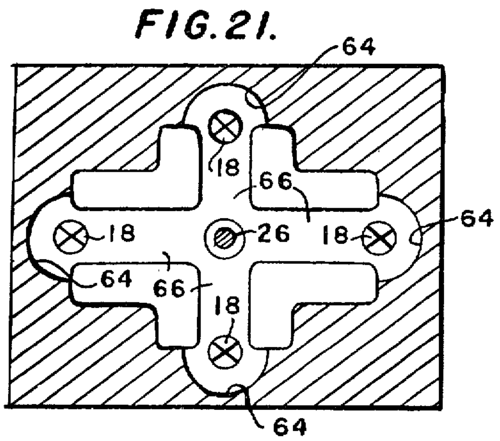
FIG. 21 represents a top sectional view similar to that of FIG. 20 of another embodiment of the ridge connected cavity arrangement in which a plurality of diodes are mounted in respective cavities at opposite ends of a plurality of ridge wave guides.

FIGS. 19, 20 and 21 illustrate how the ridge connected configuration of FIGS. 12 through 18 can be extended to allow simultaneous and alternating operation of two or more pulsed semiconductor devices coupled into a single output transmission line. In the embodiment of FIGS. 19 and 20 the ridge 66 extends from one end wall to the other with the coaxial transmission line located midway between the two opposite end walls. Adjacent to either end of the ridge 66, a pair of respective partial, disc-shaped radial cavities 64 are formed in the housing. Diodes 18 are located respectively at the centers of the two cavities 64.

In the simultaneous operation of two pulsed L.S.A. devices it is difficult to achieve synchronous operation because the physical separation ordinarily causes a half cycle delay between the starting of oscillation in the two devices. The start of oscillation in one device triggers the start of oscillation in the other device. The result is anti-synchronous operation which is difficult to couple out. One solution to this problem is to separate the devices electrically a half wave length apart. Thus, a full cycle delay between first cycles of oscillation in the two devices will occur resulting in synchronous operation.

In the case of pulsed devives, such as L.S.A. diodes, it is often desirable to have twice as many pulses each second rather than twice the power in each pulse, as accomplished by simultaneous or synchronous operation. The repetition rate of pulse bias application is limited by device heating, however. Staggered operation of two L.S.A. devices in the embodiment of FIGS. 19 and 20 can be achieved by alternating the application of bias voltage to the devices. The result is twice as many pulses per second. With one device operating and the other device dormant, power easily couples to the output coaxial transmission line. No appreciable power is lost to the dormant device in its cavity, however, because it behaves nearly like a short circuit. In this case the distance from the coaxial transmission line to the diode would be a quarter wave length for the reason explained in FIGS. 15 and 16.

In FIG. 21 a composite arrangement of four ridge wave guide structures 66 radiating symmetrically from a central coaxial transmission line 26 permits simultaneous or alternating operation of four diodes 18 each with an associated flat radial cavity 64 located at the adjacent end of the respective ridge 66.

The ridge-connected radial cavity as represented by the embodiments of FIGS. 12 through 13 is also useful in connection with a varactor-tuned Gunn oscillator. In such an arrangement the diode 18 would be a Gunn diode and a varactor would be positioned at the interior end of the center wire 30 of the coaxial transmission line 26 in the gap between the top of the ridge 66 and the interior upper surface of the housing 760. In addition, the microwave signals can be confined to the cavity by placing a suitable wave trap (not shown) in the coaxial transmission line 26. Another coaxial transmission line (not shown) with its axis parallel to the terminated (wave trapped) coaxial transmission line can be located either between the Gunn diode and the terminated transmission line or farther along the extended ridge 66 away from the Gunn diode. In this manner independent Gunn diode bias, varactor bias and microwave output ports are made possible.

Figure 22:
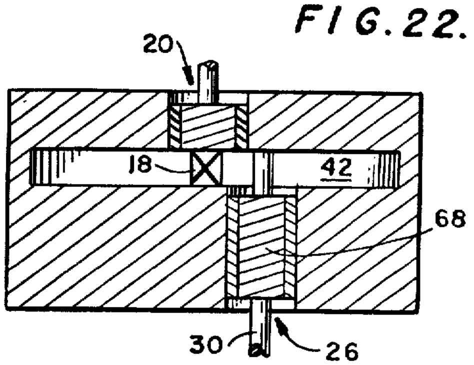
FIG. 22 is a sectional view similar to that of FIG. 7, representing a multi-axis radial flat circular cavity having means in the output line for controlling the loading of the fundamental and second harmonic frequencies.
Figure 23:
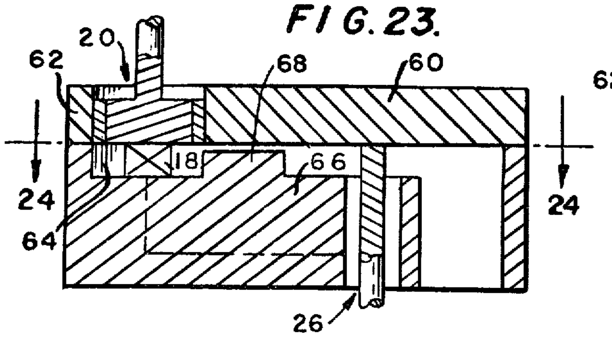
FIG. 23 is a longitudinal section similar to that of FIG. 12, illustrating a ridge-connected cavity arrangement in which a low impedance section or step is included in the ridge to control output loading at the fundamental and second harmonics.
Figure 24:
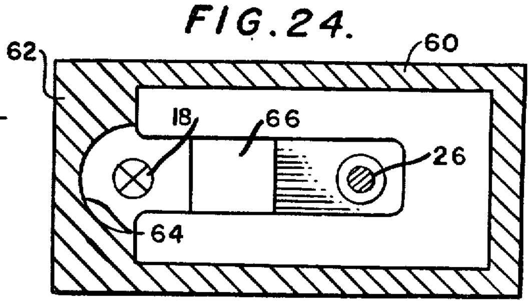
FIG. 24 is a sectional view taken along lines 24—24 of FIG. 23.

The final section of this disclosure relating to FIGS. 22, 23 and 24 describes a technique for increasing the loading of the fundamental frequency of oscillation produced by the diode. The system is explained in connection with the multi-axis disc-shaped cavity 42 of FIG. 7 and the ridge-connected cavity geometry of FIG. 12, but is equally applicable to all other multi-axis cavities including those specifically described herein.

The output of a semiconductor oscillator is distributed over a fundamental frequency and a succession of harmonic frequencies which are integral multiples of the fundamental frequency. Most of the power is concentrated in the fundamental frequency and the second harmonic in the output of an L.S.A. or bulk effect oscillator. In the following discussion it is important to keep in mind that the second harmonic is two times the fundamental frequency and thus has a wave length half as long as the fundamental wave length.

In the multi-axis cavities the loading of the fundamental frequency can be altered by incorporating in the coaxial transmission line 26 a lower impedance section or controlled discontinuity, termed a slug, that is one quarter wave length long at the fundamental frequency. The fundamental frequency impedance is reduced at the entrance to the slug as seen by the output signal passing through the slug. The second harmonic impedance is unaltered by this quarter fundamental wave length slug. The distance of the quarter wave length slug along the transmission line from the radial cavity also determines the loading and as the slug is moved along the line a series of maxima in fundamental frequency power are observed. The first maxima occurs when the near end of the slug is just below the floor of the cavity. Other maxima occur at any integral number of half wave lengths below the floor of the cavity at the fundamental frequency. By means of a controlled experiment it was found that the loading of the second harmonic could be similarly altered by a special separate slug. The second harmonic slug was designed to alter only the second harmonic loading. It was noted in particular that when the second harmonic was "unloaded," the power at the fundamental frequency was increased. But this is a separate effect and is not to be confused with loading the fundamental frequency. As the second harmonic slug was moved along the coaxial line, maxima in fundamental frequency power were observed to occur at any integral number of second harmonic half wave lengths away from the floor of the cavity. A second harmonic half wave length is a quarter of the fundamental wave length and therefore twice as many maxima occur with the second harmonic slug as with the fundamental slug movement. It was deduced from this controlled experiment that a single slug of proper dimensions and impedance suitably positioned could take the place of the two slugs and cause the two separate effects of unloading the second harmonic and loading the fundamental frequency to occur by virtue of the single slug.

The resulting design is shown in FIG. 22 in connection with a multi-axis radial cavity. The single slug 68 has low impedance at both the fundamental frequency and the second harmonic frequency and is one-eighth wave length long at the fundamental frequency. The position of the slug is determined to be one of the distances from the floor of the cavity at which maxima in the fundamental frequency power occurred coincidentally for both the fundamental slug and the special second harmonic slug used in the experiment.

The proper location for the one-eighth wave length slug is approximately at every integral multiple of the fundamental frequency half wave length distance of the close end of the slug from the floor of the cavity. The first optimum position for the slug will be close to the cavity floor. The small displacement of the full power maximum from the cavity floor in the case of the radial cavity 42 of FIG. 22 is due to the small effective inductive reactance in series with the resistive output of the oscillator. This inductive reactance is due to the nonsinusoidal relaxation nature of efficient bulk effect oscillations, which are lower in frequency than the true resonance that would occur if the oscillation were sinusoidal. The positioning of the one-eighth wave length slug is not critical when located at the first, near position for optimum performance as shown in FIG. 22.

A 25 ohm slug 68 approximately loads the fundamental frequency twice as much and reduces the loading of the second harmonic to one-fourth the value with no slug present. In the absence of a special loading slug a typical value of fundamental frequency efficiently achievable is 12% if the second harmonic is equally loaded. In a device actually constructed according to the invention a 25 ohm impedance slug one-eighth wave length at 3 GHz was located 3 millimeters away from the cavity floor. The result was 18.3% efficiency at the fundamental frequency. Theoretically 18.5% is predicted to be an upper limit for the particular L.S.A. device tested. Because of the close spacing of the slug, one-eighth wave length to the cavity floor, smooth operation over a broad bias-tuned frequency range of an L.S.A. diode is achieved, and the position of the slug may be moved up to 3 percent of the wave length in either direction with no adverse effect. This unique means of loading thus has simplicity, small size and smoothness of performance.

The one-eighth wave length low impedance slug concept has also been applied to the ridge-connected radial cavity structure as shown in FIGS. 23 and 24. In this embodiment instead of locating the slug in the coaxial output transmission line 26, the slug is formed as a one-eighth wave length low impedance section 68' of the ridge 66 in the ridge wave guide structure. The low impedance section 68' is a step discontinuity which changes the characteristic impedance of the ridge wave guide. The position of the one-eighth wave length section 68' is determined in a similar manner to that described for the cavity of FIG. 22. In the case that a one-eighth wave length low impedance slug is used to obtain optimum efficiency, the distance from the diode to the cavity wall must be just under a 1/8 wave length. In practice a value near 5/48 of a wave length was optimum.

The multi-axis radial cavities including elliptical, flat circular, conical and ridge-connected versions represent an important new contribution to the field of microwave oscillators and make possible optimized performance for a variety of semiconductor oscillator devices. Several of the cavities including the flat circular design and the conical cavity offer simple construction and exceptional ease of manufacture. Another central advantage of all of the cavities described herein is that because the output coupling in most of the described arrangements is by means of a mutual inductance effect rather than a transmission line operation requiring precise positioning, a greater degree of freedom is permitted for the positioning of the diode and coaxial transmission line within a given cavity.

Many variations of the specific embodiments disclosed herein are of course possible, and it is intended that the disclosure should in fact suggest these variations and modifications to those familiar with microwave diode practices. For example, the design of the wave trap for applying bias voltage to the diode may take many different forms witout altering the important characteristics of the cavities described herein. In addition, the electrically conductive block within which the various cavities are formed may be broken down or divided into separate pieces to facilitate manufacture and assembly. The dielectric material which fills the void of the cavity in each situation may be any one of the known dielectrics commonly used in wave guide practice. Moreover, the low impedance sections and slugs incorporated in transmission lines as described in this disclosure represent in each case a preferred technique of introducing a controlled discontinuity and are intended to suggest other equivalent techniques of changing the characteristic impedance of the associated transmission lines in a similar manner.

It is emphasized that applications of the various multiaxis cavity embodiment disclosed herein are not limited of necessity to any particular type of microwave semiconductor device. Although the cavities are particularly suited for optmizing the performance of L.S.A. diodes, the cavity designs are considered to be applicable in a similar manner to similar microwave devices, including any not yet discovered, which have similar operating characteristics.

What is claimed is:

1. A Gunn effect amplifier circuit, comprising electrically conductive means for defining an elliptical cavity bounded by two parallel elliptical planar surface and an elliptical ringlike surface joining the two planar surfaces at their respective peripheries, a doped Gunn effect device coaxially mounted in said cavity at one of the focus lines associated with the elliptical ringlike surface, means for applying DC bias voltage to said device, coaxial transmission line means coaxially located at the other focus line associated with said cavity serving as a conduit for input and output signals, and connector means external to said cavity coupled to said transmission line means for introducing an input microwave signal into said cavity and for simultaneously extracting an amplified microwave output signal therefrom.

2. The amplifier circuit of claim 1, wherein said connector means is in the form of a microwave circulator.

3. The amplifier circuit of claim 1, wherein the size of said cavity is predetermined such that the propagation cutoff frequency is below the lower end of the amplification bandwidth associated with said device.

* * * * *